(12) United States Patent
Tanaka et al.

(10) Patent No.: US 6,251,264 B1
(45) Date of Patent: Jun. 26, 2001

(54) WATER PURIFICATION APPARATUS

(75) Inventors: Tetsuya Tanaka, Chiyoda-machi; Koichi Tsuzuki, Tsuchiura, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/321,871

(22) Filed: May 28, 1999

(30) Foreign Application Priority Data

Apr. 2, 1999 (JP) .................................................. 11-095920

(51) Int. Cl.$^7$ ...................................................... C02F 1/32
(52) U.S. Cl. ...................... 210/96.1; 210/143; 210/192; 210/195.3; 210/199; 210/202; 210/208
(58) Field of Search ..................... 210/709, 748, 210/711, 713, 717, 721, 724, 725, 726, 727, 759, 763, 96.1, 101, 143, 192, 199, 202, 195.3, 208, 760

(56) References Cited

U.S. PATENT DOCUMENTS

| | | | |
|---|---|---|---|
| 3,442,802 | * 5/1969 | Hamilton et al. | 210/763 |
| 4,029,578 | * 6/1977 | Turk | 210/760 |
| 4,321,143 | * 3/1982 | Wilms et al. | 210/631 |
| 4,465,593 | * 8/1984 | Wemhoff | 210/96.1 |
| 4,693,833 | * 9/1987 | Toshikuni et al. | 210/759 |
| 5,130,031 | * 7/1992 | Johnston | 210/748 |
| 5,158,686 | * 10/1992 | Kigèl | 210/713 |
| 5,332,508 | * 7/1994 | Foster et al. | 210/711 |
| 5,401,420 | * 3/1995 | Siefert et al. | 210/709 |
| 5,449,467 | * 9/1995 | Taoda et al. | 210/748 |
| 5,456,844 | * 10/1995 | Lobb | 210/708 |
| 5,993,667 | * 11/1999 | Overman | 210/709 |

FOREIGN PATENT DOCUMENTS

| | | |
|---|---|---|
| 55-39282 | 3/1980 | (JP) . |
| 57-130597 | 8/1982 | (JP) . |
| 3-278883 | 12/1991 | (JP) . |
| 4-18986 | 1/1992 | (JP) . |
| 6-182362 | 7/1994 | (JP) . |
| 9-117773 | 5/1997 | (JP) . |

\* cited by examiner

*Primary Examiner*—Peter A. Hruskoci
(74) *Attorney, Agent, or Firm*—Crowell & Moring, L.L.P.

(57) ABSTRACT

A method for purifying water containing organic matter includes dispersing photo-catalyst particles and an inorganic coagulant into the water; oxidizing the organic matter by activating the photo-catalyst particles by irradiating them with light; maintaining the diameter of the photo-catalyst particles to be equal to or less than 0.1 mm; and condensing the photo-catalyst particles and the inorganic coagulant.

13 Claims, 7 Drawing Sheets

WATER PURIFICATION APPARATUS

BACKGROUND OF THE INVENTION

1. Field of the Invention

The present invention relates to a water purification apparatus and a method thereof, for purifying water with oxidization process of an organic matter(s) or compound(s) contained therein, in particular, to a water purification apparatus and a method thereof, in which the organic matter(s) in water is purified with the oxidization process by use of catalysts, including photo-catalyst, such as titanium dioxide.

2. Description of Prior Art

In processing of various kinds of water, including sewage, draining from a household, river water, lake water, water of water supply or service, in particular, as a method for removing organic matter(s) including organic chlorine compound of a surfactant, such as trichloroethylene, trihalomethane, and further harmful organic matters such as dioxin and PCB, etc., from water, which may still remained within wastewater after being highly treated or processed by removing the suspended matters therefrom, there is already known oxidization process of the organic compounds or matters contained within water to be processed (i.e., raw water) with use of the photo-catalyst. The oxidization process with use the such photo-catalyst is often used or practiced for decomposing the harmful organic matters mixed or contained within a fluid such as the water, or for disinfection thereof, and as the substance showing such photo-catalytic function is well-known the titanium dioxide, for example.

Ordinarily, particle of the titanium dioxide is dispersed into the water to be treated or processed (i.e., the raw water), and thereafter ultraviolet rays are irradiated into the raw water so as to cause a reaction of oxidization on the photo-catalyst. However, the oxidization of the photo-catalyst occurs on the surface of the particle of titanium dioxide dispersed, therefore, in order to increase an efficiency of the reaction thereof, it is important that the particle of titanium dioxide dispersed into the fluid to be processed is as small or minute as possible so as to enlarge the specific surface area thereof, thereby increasing the contact area between the particle of titanium dioxide and the fluid to be processed.

Then, such the photo-catalyst particle is separated from the fluid to be processed after the oxidization process thereof, so as to be used again (i.e., for reuse), therefore, in a case where it is applied to the fluid of a gaseous body like the air, even the particle of photo-catalyst being minute in the size thereof, the photo-catalyst particle can be separated or removed from the liquid to be treated easily, because of the difference between them in the specific gravity. However, in a case where it is applied to the fluid of a liquid such as water, the minute particle of photo-catalyst dispersed into the liquid of water is very inferior or small in the precipitation or sedimentation thereof comparing to that in the gaseous body. Therefore, in a case where the liquid such as water is processed with use of the photo-catalyst, such as the titanium dioxide, the particle of photo-catalyst is made large in the size at the cost of efficiency in the reaction. Alternatively, when the fine or minute particle thereof is used, a method of so-called a membrane separation method is applied to separate the photo-catalyst particle from the fluid after being treated or processed.

However, in a case where the particle of photo-catalyst is made large in the size, there is a drawback that an apparatus or a device itself must be large-scaled for compensating the decrease in a capacity of processing accompanying with the reduction in the reaction efficiency. Further, in the case where the above-mentioned membrane separation method is applied, there is still remained a problem that a large motive power is necessitated, in particular, in the portion where the membrane separation is performed.

Therefore, from such view point of the background as mentioned in the above, conventionally, for example in Japanese Patent Laying-open No. Hei 9-174067 (1997), there is proposed a method, wherein a minute particle of iron hydroxide and/or a minute particle of aluminum hydroxide are mixed to be muddled into the water to be processed (i.e., the raw water) in an oxidization processing vessel with the minute particle of the photo-catalyst, and is added therein a polymer coagulant after the oxidization process by irradiating the ultraviolet rays. According to such method, with a function of the polymer coagulant which is added into the water to be processed after the oxidization process, the photo-catalyst particle dispersed into the water is condensed with the particles of the minute particle of iron hydroxide and/or the minute particle of aluminum hydroxide to be separated, and the separated sludge is returned to the oxidization processing vessel again for reuse thereof.

Attached FIG. 7 is a block diagram of showing a processing apparatus according to the above Japanese Patent Laying-Open No. Hei 9-174067 (1997), and as is shown in FIG. 7, first of all, an organic pollutant contained in the raw water is decomposed and/or removed (i.e., decomposed into components, such as water and/or carbon dioxide, etc.) by the oxidization due to the photo-catalyst particle within the oxidization processing vessel or reservoir 1, in the water purification apparatus according to the conventional art. Namely, in the oxidization processing reservoir 1, there is provided an light source 2 of ultraviolet rays, thereby the particle of photo-catalyst being thrown or cast into the raw water beforehand is irradiated with the ultraviolet rays so as to cause the photo-catalytic reaction thereof. However, into the water to be processed, i.e., the raw water within the oxidization processing reservoir 1, the minute particle of iron hydroxide and/or the minute particle of aluminum hydroxide are muddled in advance. And into the water flowing out from the oxidization processing reservoir 1 is added the polymer coagulant from an injection means 20 thereof.

Here, when the polymer coagulant is added into the water flowing out from the oxidization processing reservoir 1, the minute particle of iron hydroxide and/or the minute particle of aluminum hydroxide form flock with the photo-catalyst particle dispersed into the water with the condensation function thereof, and the condensed flock formed is separated as sludge 9, separating from the water to be processed in a sedimentation separation reservoir 8 positioned in a downstream thereof. Thereafter, the sludge 9 which is separated from the water to be processed is returned back to the oxidization processing reservoir 1 so as to be added into the raw water, and is utilized for the oxidizing process with the photo-catalyst particle, again.

Namely, in the water purification apparatus and the processing method thereof, according to the conventional art mentioned above, the flock (i.e., the separated sludge 9), which is returned to the oxidization processing reservoir 1 to be reused, is released from the condensation function of the polymer coagulant, since it is decomposed by the oxidization due to the above photo-catalyst in the oxidization processing reservoir 1. As a result of this, the photo-catalyst particle and the minute particles of iron hydroxide and/or of aluminum hydroxide are free from the condensation function of the polymer coagulant, and are muddled into the water as sludge particles thereof, again, to be reused. In such the manner as mentioned in the above, the oxidizing (i.e., purifying) process is achieved with high efficiency with use of the powder of photo-catalyst, in the oxidization processing method of the water according to the conventional art (i.e., Japanese Patent Laying-Open No. Hei 9-174067 (1997)).

However, there are still remained several problems with the water purification apparatus and the method thereof according to the conventional art.

Namely, there is a problem as one of them that, since the minute particle of the photo-catalyst is continuously separated and collected from the water to be processed, also the polymer coagulant must be added continuously, such as polyacrylamide, etc., being expensive in the price thereof. Therefore, it has a drawback that the cost for the apparatus becomes to be large, in particular in running cost thereof.

Further, with the water purification apparatus and the method thereof according to the conventional art, the polymer coagulant, which is added for condensing the minute particle of the photo-catalyst when the water to be processed flows out from the oxidization processing reservoir 1, is thereafter returned back to the oxidization processing reservoir 1 again, and is decomposed by the photo-catalytic reaction of the minute particle of the photo-catalyst therein. However, the energy (i.e., the ultraviolet rays) which is necessary for decomposing the polymer coagulant turned back to the oxidization processing reservoir 1 is in excess, from a view point of energy consumption which is used for decomposing the organic matter(s) in the raw water, i.e., the inherent purpose of the apparatus, thereby bringing about an ill influence upon the efficiency of the oxidizing process in the apparatus.

Furthermore, in the above oxidization processing reservoir 1, the minute particle of the photo-catalyst thrown into the raw water keeps to form relatively large condensing flocks due to the condensation function of the polymer coagulant, during the period until when the returned polymer coagulant is decomposed by the photo-catalytic reaction. Therefore, there is a problem that the photo-catalytic reaction in the oxidization processing reservoir 1 is decreased down in the efficiency thereof, since the effective contacting area of the photo-catalyst comes to be small.

SUMMARY OF THE INVENTION

Therefore, an object of the present invention, for dissolving the drawbacks and/or problems in the water purification apparatus and the method thereof according to the conventional art mentioned above in detail, is to provide a water purification apparatus and a method thereof, with which the purification process of water can be achieved with maintaining the oxidizing reaction due to catalyst at a high efficiency, without using such the expensive polymer coagulant.

According to the present invention, for accomplishing the object mentioned above, first of all, there is provided a water purification apparatus for purifying an organic matter contained in water by oxidization thereof with use of a catalyst, comprising:

an oxidization processing reservoir for reserving the water to be processed into which is added an inorganic coagulant and dispersed with the catalyst particle in a form of powder;

means for activating said catalyst inside said oxidization processing reservoir;

a separation reservoir for separating from the water to be processed said catalyst particle which is condensed with the inorganic coagulant; and means for maintaining the catalyst particle dispersed in the water to be processed within said oxidization processing reservoir to be equal to or less than 0.1 mm in diameter thereof.

Also, according to the present invention, there is provided the water purification apparatus as defined in the above, wherein said particle diameter maintaining means comprises means for controlling pH value in the water to be processed within said oxidization processing reservoir.

Further, according to the present invention, there is provided the water purification apparatus as defined in the above, wherein said particle diameter maintaining means further comprises means for detecting pH value in the water to be processed within said oxidization processing reservoir.

And further, according to the present invention, there is provided the water purification apparatus as defined in the above, further comprising means for controlling pH value within said separation reservoir.

Further, according to the present invention, there is provided the water purification apparatus as defined in the above, wherein said oxidization processing reservoir and said separation reservoir are formed as an unit in body thereof.

Furthermore, according to the present invention, there is provided the water purification apparatus as defined in the above, wherein said catalyst is photo-catalyst and said catalyst activating means comprises means for emitting light therefrom.

Furthermore, according to the present invention, there is also provided the water purification apparatus as defined in the above, wherein said oxidization processing reservoir comprises means for aerating the water to be processed therein.

Furthermore, according to the present invention, there is provided the water purification apparatus as defined in the above, wherein said oxidization processing reservoir comprises means for injecting ozone into the water to be processed therein.

Furthermore, according to the present invention, there is provided the water purification apparatus as defined in the above, further comprising means for adding a material which induces Fenton oxidization in the water to be processed within said oxidization processing reservoir.

Moreover, according to the present invention, there is provided the water purification apparatus as defined in the above, further comprising a stirrer between said oxidization processing reservoir and said separation reservoir.

Further, according to the present invention, there is provided the water purification apparatus as defined in the above, further comprising means for returning sludge containing said condensed catalyst particle which is separated within said separation reservoir to said oxidization processing reservoir.

Further, according to the present invention, there is provided the water purification apparatus as defined in the above, wherein said sludge returning means further comprises means for dissolving the sludge containing said condensed catalyst particle therein.

Also, according to the present invention, for accomplishing the object mentioned above, there is provided a water purification method for purifying an organic matter contained in water by oxidization thereof with use of an catalyst, comprising following steps:

dispersing the photo-catalyst particle in a form of powder into the water to be processed;

oxidizing the organic matter by activating said catalyst dispersed into the water to be processed, for processing thereof; and condensing said dispersed catalyst particle to be separated from the water to be processed, after the oxidization process thereof by the irradiation of the light, by a function of an inorganic coagulant, wherein the catalyst particle dispersed in the water to be processed is maintained to be equal to or less than 0.1 mm in diameter thereof in said step for oxidizing process.

Also, according to the present invention, there is provided the water purification method as defined in the above, wherein said water to be processed is controlled in pH value thereof, so that the photo-catalyst particle dispersed in the water to be processed is maintained to be equal to or less than 0.1 mm in the diameter in said step of oxidizing process.

Further, according to the present invention, there is provided the water purification method as defined in the above, further comprising a step for separating the catalyst particle which is condensed by a function of said inorganic coagulant by sedimentation of said condensed catalyst particle, after said step of oxidizing process.

Further, according to the present invention, there is provided the water purification method as defined in the above, wherein pH value of the water to be processed is controlled in said step for sedimentation separation, so that the photo-catalyst particle dispersed in the water to be processed in said step for oxidizing process is smaller in particle diameter thereof than that which is dispersed therein in said step for sedimentation separation.

Further, according to the present invention, there is provided the water purification method as defined in the above, wherein the catalyst is a photo-catalyst and a light is irradiated onto the water into which the photo-catalyst is dispersed in said step of oxidizing process.

Furthermore, according to the present invention, there is provided the water purification method as defined in the above, wherein further ozone is injected into the water to be processed in said step of oxidizing process.

Moreover, according to the present invention, there is provided the water purification method as defined in the above, wherein further a material inducing Fenton oxidization reaction is added into the water to be processed in said step of oxidizing process.

Furthermore, according to the present invention, there is provided the water purification method as defined in the above, wherein the water to be processed into which the photo-catalyst particle is dispersed is further stirred in said step of oxidizing process.

Further, according to the present invention, there is provided the water purification method as defined in the above, further comprising a step for returning the photo-catalyst particle which is separated in said step for separation by condensing thereof to the water to be processed in said step for oxidization process, again.

Also, according to the present invention, there is provided the water purification method as defined in the above, further comprising a pre-processing step for removing suspended material in the water to be processed, before the step of purifying the organic matter in the water with use of the catalyst.

Further, according to the present invention, there is provided the water purification method as defined in the above, further comprising a post-processing step for removing low molecular organic matter remained in the processed water and/or the organic matter being easily decomposed by microorganisms, after the step of purifying the organic matter in the water with use of the catalyst.

And, finally, according to the present invention, there is provided the water purification method as defined in the above, wherein a portion of the processed water flowing out after said post-processing step is turned back to a upper stream of the step of purifying the organic matter in the water with use of the catalyst, whereby performing those processes circularly.

DETAILED DESCRIPTION OF PREFERRED EMBODIMENTS

Hereinafter, embodiments according to the present invention will be fully explained by referring to the attached drawings.

Figure 1:
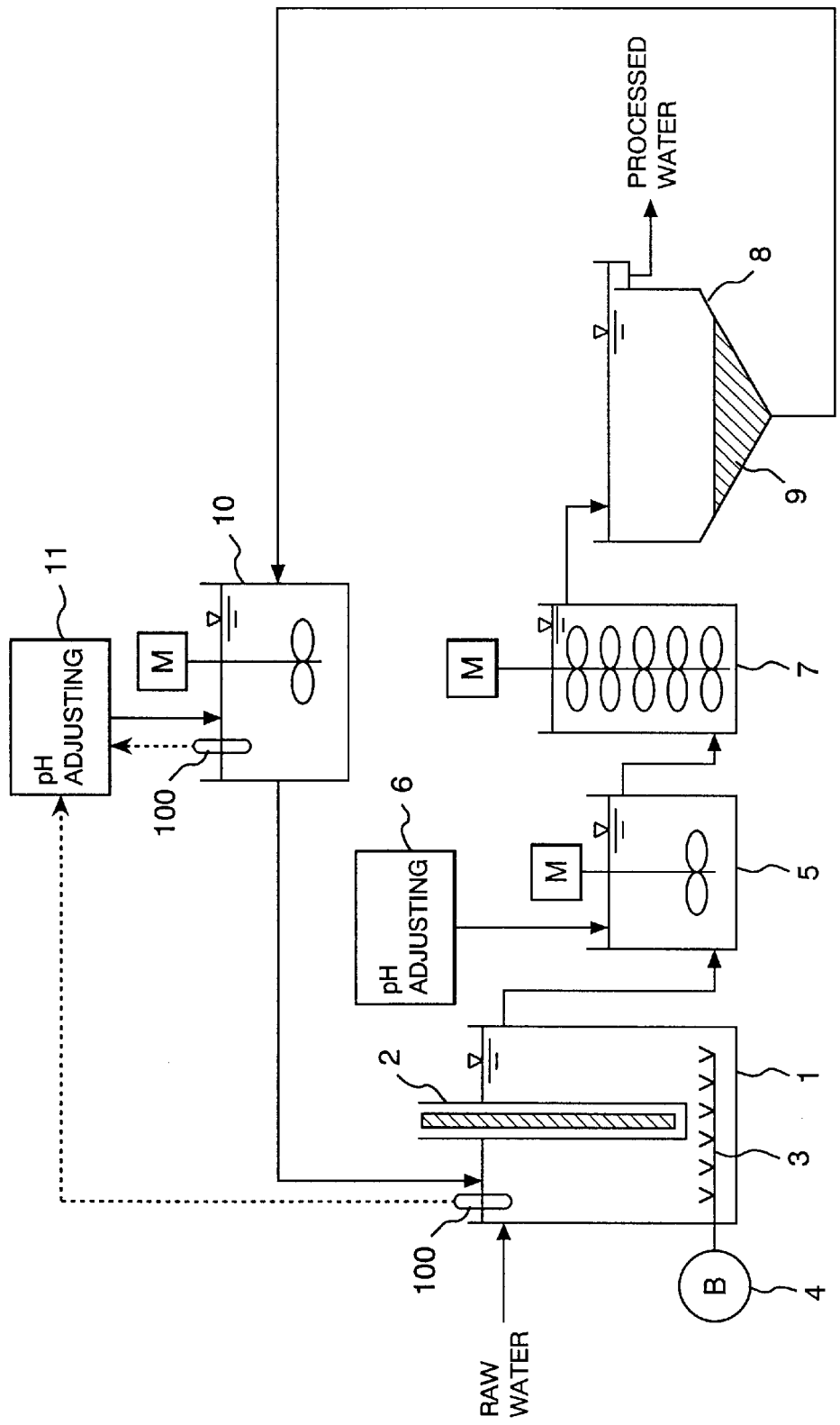
FIG. 1 is a block diagram of showing the construction of a water purification apparatus according to an embodiment of the present invention.

First of all, FIG. 1 shows the water purification apparatus according to an embodiment of the present invention, wherein the water purification method according to the present invention is practiced therewith. Here, the water purification apparatus shown in this figure, has a function of removing the organic compound(s), in particular, including organic chlorine compound of a surfactant, such as trichloroethylene, trihalomethane, and further harmful organic matters such as dioxin and PCB, etc., from water, which compound may still remains in wasted water after being highly processed by removing the suspended matters therefrom in processing of various kinds of water, including sewage, draining drained form a household, river water, lake water, water of water supply or service.

Such the water purification apparatus, as is shown in FIG. 1, the raw water which still contains the harmful organic matters to be removed therefrom is led into an oxidization processing vessel or reservoir 1 in a cylindrical shape, for example. However, into the raw water is thrown or cast a powder of photo-catalyst, such as titanium dioxide or the like, as well as an inorganic coagulant, in advance, thereby being dispersed with the powder-like photo-catalyst into the raw water within the oxidization processing reservoir 1. In the oxidization processing reservoir 1, as shown in the figure, a light source 2 of ultraviolet rays is positioned at a portion thereof (for example, at the central portion in the figure), and therefore the ultraviolet rays from the ultraviolet ray light source 2 is irradiated onto the particle-like photo-catalyst (on the surface of it) within the raw water, thereby causing photo-catalytic reaction thereof. Namely, with the photo-catalytic reaction, the above organic pollutant in the raw water introduced into the oxidization processing reservoir 1 is decomposed to be removed therefrom. In other words, it is decomposed into harmless materials, such as water and/or carbon dioxide, etc.

In the purification apparatus, the raw water, being taken out from an outlet provided at an upper portion of the oxidization processing reservoir 1 after being oxidized to be processed therein, is sent or transferred to a fast speed stirring reservoir 5 to be stirred therein, and is further sent to a slow speed stirring reservoir 7. Thereafter, the raw water from the slow speed stirring reservoir 7 is sent to a reservoir 8 for separating the photo-catalyst particle and the inorganic coagulant from it by sedimentation thereof, thereby being discharged as processed water from an outlet provided at an upper portion of the sedimentation separating reservoir 8. Further, the sedimentation separating reservoir 8 is formed in a conical shape at the bottom portion thereof, therefore the sludge being piled up and/or settled down on the bottom portion of the reservoir can be taken out with ease.

However, with such the purification apparatus, as the inorganic coagulant to be thrown into the raw water can be listed an aluminum salt, such as aluminum sulfate, aluminum chloride, etc., an ion salt, such as ferrous sulfate, ferric sulfate, ferric chloride, etc. Then, the raw water thrown with such the inorganic coagulant shows acidity (pH value: from 5 to 2) in the oxidization processing reservoir 1, therefore no condensation function therein. From this fact, the power-like photo-catalyst thrown into the raw water in advance will not condensed within the oxidization processing reservoir 1, and therefore is kept to be large in the specific area thereof, thereby enabling increase in the contacting area of the photo-catalyst with the water to be processed.

Thereafter, the photo-catalyst such as titanium dioxide, after purifying the raw water by the oxidizing function thereof as mentioned in the above, is discharged from the oxidization processing reservoir 1 with the processed raw water, and is led into the fast speed stirring reservoir 5 after being added with, for example, an alkaline material from a pH adjuster 6, to be stirred rapidly or swiftly therein. Namely, the pH value of the raw water is adjusted or controlled therewith. However, in the present embodiment, the raw water being neutralized with addition of the alkaline material such as an alkaline solution, or in other words, being controlled in the pH value thereof, is transferred to the slow speed stirring reservoir 7 provided in a further down stream.

Namely, the photo-catalyst particle in the raw water which is stirred swiftly and adjusted in the pH value in the fast stirring reservoir 5 forms fine or minute flocks with the inorganic coagulant due to the electrochemical condensing function thereof. Then, the raw water containing such the minute flocks therein is transferred to the slow speed stirring reservoir 7 mentioned above. In the slow speed stirring reservoir 7, the neutralized raw water is stirred slowly, so as to gather the minute flocks formed in the fast stirring reservoir 5 furthermore, thereby forming flocks relatively large in the size (around from 2 mm to 3 mm in the particle diameter at the maximum) being superior in the sedimentation property or rate.

In such the manner, the raw water containing the relatively large flocks, including the photo-catalyst particle therein is transferred to the sedimentation separating reservoir 8. And, in the sedimentation separating reservoir 8, the relatively large flocks formed in the above slow speed stirring reservoir 7 settles down to be separated as the sludge 9 separated. Namely, in the sedimentation separating reservoir 8, the photo-catalyst particle dispersed and the inorganic coagulant added are separated or separated from the raw water, thereby only the clear water at the upper portion thereof is discharged from or released, as the processed water.

On the other hand, the photo-catalyst particle in form of the flock, settling down to be separated from the water to be processed by the sedimentation after the oxidizing reaction thereof, is taken out from the bottom of the sedimentation separating reservoir 8 to be introduced into a sludge dissolving reservoir 10. And also here, the sludge including the photo-catalyst particle and the inorganic coagulant therein is introduced into the oxidization processing reservoir 1 to be reused again, after being controlled or adjusted in the pH value thereof by means of a pH adjuster 11 and a stirrer 12. Namely, photo-catalyst particle is dispersed into the raw water again. However, the details of it will be mentioned later, below.

On a while, the photo-catalyst powder used in the purification apparatus mentioned above is a powder of such as titanium dioxide and so on. Further, the powder is preferable to be approximately from several nm up to several ten $\mu$m in the size, in particular in the particle diameter thereof. Also, it is preferable for the photo-catalyst powder to be added into the raw water around from approximately 100 ppm up to 10,000 ppm in the concentration or density. Further, as the inorganic coagulant to be thrown into the raw water can be listed the aluminum salt, such as aluminum sulfate, aluminum chloride, etc., and the ion salt, such as ferrous sulfate, ferric sulfate, ferric chloride, etc., as mentioned in the above, and with use of those inorganic coagulants, since all of them never change the property due to the oxidizing function of the photo-catalytic reaction, they will not lose the electro-chemical condensation function as the inorganic coagulant (cf. the polymer coagulant used in the conventional art is decomposed by the oxidizing function of the photo-catalytic, thereby losing the condensation function thereof). Therefore, the inorganic coagulant can be reused as well as the photocatalytic powder by returning them back to the oxidization processing reservoir 1 as the sludge, thereby being preferable economically.

Also, the inorganic coagulant is preferable to be added in an amount from 0.01 up to 1 g (as $Al_2O_3$) with respect to 1 g of the photo-catalytic powder, for instance, when using aluminum sulfate.

Further, as the light source 2 of ultraviolet rays, which is provided in the oxidization processing reservoir 1 mentioned above, can be used a low pressure mercury lamp (a disinfectant lamp), a black light, a middle or high pressure mercury lamp, etc., for example. However, although the light source 2 of ultraviolet rays is explained as to be provided inside the oxidization processing reservoir 1 in the present embodiment, however, the oxidization processing reservoir 1 can be formed from material through which the ultraviolet ray lights can penetrate, such as quartz (silica) glass or the like, and is positioned outside to be positioned under the sunshine, so as to utilize the ultraviolet rays included in the solar lights (i.e., sun shining) instead of provision of the light source 2.

Furthermore, in the embodiment shown in FIG. 1, an aeration conduit 3 is provided inside (i.e., at the bottom) the oxidization processing reservoir 1. And, to this aeration conduit 3 is connected a blower 4 so as to inject air into inside of the oxidization processing reservoir 1 therefrom.

Namely, by blowing the air into the raw water within the oxidization processing reservoir 1, oxygen necessary for the oxidization due to the photo-catalyst can be supplied into the raw water, and further by the aeration and stirring effect thereof, the photo-catalyst particle can be dispersed into the raw water with uniformity, therefore providing a preferable construction.

Further, in place of the aeration and stirring by means of the above aeration conduit 3 and the blower 4, or in addition thereto, it is also possible to stir the inside of the oxidization processing reservoir 1 by another stirrer of a propeller type, etc. Alternatively, in place of supplying the oxygen into the raw water through the blower 4 as mentioned above, or in addition thereto, it is also possible to provide an ozone generator so as to inject or supply into the raw water with ozone which is generated therewith. In this case, with the synergetic effect of the oxidization by the ozone due to blow-in thereof and the photo-catalytic reaction, further effective oxidization processing can be performed.

However, in the embodiment mentioned in the above, the water being processed in the oxidization processing reservoir 1 is transferred to the fast speed stirring reservoir 5 with containing the photo-catalyst powder or particle and the inorganic coagulant together therein. In this instance, an alkaline material is put into so as to neutralize the raw water in the pH value in the fast speed stirring reservoir 5 so that the photo-catalyst particle is condensed with the inorganic coagulant therein. In this case, the pH value is preferably adjusted within a range of pH approximately from 5 to 8. However, this pH adjuster 6 adds the alkaline material, such as sodium hydroxide, potassium hydroxide and so on, or lime, so as to neutralize the raw water in the pH value.

Here, as mentioned in the above, the separated sludge 9, including the photo-catalyst powder or particle and the inorganic coagulant which are separated by sedimentation in the sedimentation separation reservoir 8, is transferred to the sludge dissolving reservoir 10. In this sludge dissolving reservoir 10, the sludge transferred therein is adjusted in the pH value by the pH adjuster thereof, for example, to be a value less than 2 (acidity) in the pH. Namely, the inorganic coagulant such as aluminum salt, ferrous salt and so on, which is condensed with the photo-catalyst particle, is dissolved in the water again, thereby releasing the flocculated photo-catalyst particles from the electrochemical condensation function of the inorganic coagulant. Namely, it is free from the bonding of the flock and becomes the dispersed photo-catalyst particle, again. Furthermore, the pH adjuster 11 adds an acid solution, such as hydrochloric acid, sulfuric acid, etc.

In this manner, however, as is mentioned in the above, the sludge which is dissolved within the sludge dissolving reservoir 10, i.e., the slurry containing the inorganic coagulant and the photo-catalyst particles, is transferred into the sludge dissolving reservoir 10 and is cast there into the above oxidization processing reservoir 1 to be reused. Or, in place of this, the slurry containing the inorganic coagulant and the photo-catalyst particles may be added into the raw water at the upper stream of the oxidization processing reservoir 1.

In the above embodiment, the inorganic coagulant and the photo-catalyst particles which are collected after the oxidization process thereof are returned back to the oxidization processing reservoir 1 to be cast into the raw water again, as the acid slurry being dissolved in the above sludge dissolving reservoir 10. Therefore, the raw water in the oxidization processing reservoir 1 comes to be acidic. As mentioned in the above, under the environment of acidity (or alkalinity), the electrochemical condensation function is reluctant to act upon, therefore, the photo-catalyst particle is not condensed within oxidization processing reservoir 1 but is rather dispersed therein. On a while, since the oxidization due to the photo-catalyst is a reaction occurring upon the surface thereof, the fact that the photo-catalyst particle is not condensed with but rather dispersed within the oxidization processing reservoir 1 means is convenient or suitable for the oxidization process with high efficiency. From this, it is preferable to control the pH value of the raw water in the above oxidization processing reservoir 1 to be a value from 2 up to 4.

In this manner, according to the present invention, it is possible with ease to separate from the raw water the photo-catalyst in the form of the powder or particle, which is otherwise difficult to be separated from the water after being once dispersed therein, without using the expensive polymer coagulant but rather the inorganic coagulant which is relatively cheap in the price. Further, the photo-catalyst particle and the inorganic coagulant which are added into the raw water can be reused eternally or endlessly, theoretically, by repeating the condensation and the dispersion in the above sedimentation separation reservoir 8 and the sludge dissolving reservoir 10 to be separated from the raw water and turned back to the oxidization processing reservoir 1. Moreover, since the photo-catalyst particle being separated to be collected can be dispersed into the raw water in the oxidization processing reservoir 1 satisfactorily, it is possible to realize the purification process of water due to the oxidization thereof with continuity.

In actual practice, however, a portion of the photo-catalyst particle and/or the inorganic coagulant sometimes remains in the raw water from being separated therefrom perfectly and then flows out together with it. In such the case, however, it is apparent that the satisfactory performance of the oxidization process can be maintained, by providing a means for supplementing for the flowing-out of the photo-catalyst particle and/or the inorganic coagulant from the oxidization processing reservoir 1.

However, in the embodiment mentioned in the above, it is explained that, the above pH adjuster 6 puts the alkaline material into it to neutralize the acidity of the raw water within the oxidization processing reservoir 1, while the above pH adjuster 11 puts the acid material into the sludge which is collected from the sedimentation separation reservoir 8 so as to turn it into acidity to dissolve the inorganic coagulant, and thereafter returning it back into the oxidization processing reservoir 1. However, the inorganic coagulant to be put into the raw water with the photo-catalyst powder or particle will condense with the photo-catalyst particle due to the electrochemical condensation function under the neutralized environment. However, this inorganic coagulant, as is mentioned in the above, has a property that it can be dissolved not only under the environment of acidity but also under the alkaline environment (for example, from 9 to 12 in the pH value).

Then, it is also possible that the above pH adjuster 6 puts the acid material into the raw water while the pH adjuster 11 puts the alkaline material into the collected sludge. In such the case, the sludge to be put into the raw water in the oxidization processing reservoir 1 from the above pH adjuster 11 is alkaline to dissolve the inorganic coagulant therein, thereby being prevented from the condensation function of the inorganic coagulant. Namely, the photo-catalyst particle in the oxidization processing reservoir 1 will not condensed but rather be dispersed, thereby achieving the oxidization process with high efficiency. On the other hand, the above pH adjuster 6 neutralizes the raw water of the alkalinity which is discharged from this oxidization processing reservoir 1, by putting the acid material into it, thereby accelerating the condensation function due to the inorganic coagulant.

Also, as is depicted by a broken line in FIG. 1, the pH adjuster 11 may further comprise a pH detector 100 for measuring the pH value in the sludge dissolving reservoir 10, thereby being so constructed that the amount or volume of the acid or alkaline material to be put into is controlled depending upon the pH value which is measured. Furthermore, as is also depicted by the broken line in FIG. 1, the pH adjuster 11 may further comprise a pH detector 100 for measuring the pH value not in the sludge dissolving reservoir 10 but in the oxidization processing reservoir 1, thereby being so constructed that the amount or volume of the acid or alkaline material to be put into is controlled depending upon the pH value which is measured. However, as is apparent from the above explanation, in order to perform the oxidization process by the photo-catalyst power or particle with high efficiency, it is important to maintain the pH value of the raw water in the oxidization processing reservoir 1 to be within a predetermined breadth or range of the pH value (i.e., from 2 to 4 or from 9 to 12 in the pH value), and from such the view point, the latter construction is more preferable (i.e., detecting the pH value in the oxidization processing reservoir 1).

Furthermore, in the oxidization process of the organic matter(s) in the water with use of the photo-catalytic reaction, metallic ion in the raw water adheres on the surface of the photo-catalyst to covering it over, thereby causing a phenomenon in that the photo-catalytic reaction is prevented. In such the case, since scale adhering upon the surface of the photo-catalyst can be dissolved again as the metallic ion by turning into the acid condition, therefore, the above pH adjuster 6 should be constructed preferably to input the acid material into the raw water, while the above pH adjuster 11 to input the alkaline material into the sludge collected. With such the construction, it is possible to maintain the photo-catalytic reaction satisfactory with protecting from the adhesion of the scale.

Also, with such the purification apparatus by continuous oxidization of the water as described by referring to FIG. 1, the above fast speed stirring reservoir 5, the slow speed stirring reservoir 7, and the sedimentation separating reservoir 8 are provided so as to construct the means for condensation and/or separation of the photo-catalyst. However, the present invention should not be restricted therewith. For example, in place of the sedimentation separating reservoir 8, a filter apparatus, such as a membrane type filter apparatus or a sand type filter apparatus, may be provided, so as to construct the condensation and/or separation means therewith. Or, alternatively, it may be constructed with a centrifugal separator. Further, when the filter apparatus such as the membrane type filter is provided as the condensation and/or separation means, being able to separate even minute or fine flock, it can be constructed with only the fast speed stirring reservoir 5, so as to separate the formed minute or fine flock thereby directly, omitting the slow speed stirring reservoir 7. Furthermore, it is also possible to separate the flock magnetically, by adding magnetic powder to form the condensed magnetic flock while providing a magnetic separation means therewith.

Further, in particular, when the suspended solid is contained in the raw water, irrespective of the oxidization process by the photo-catalyst particle, it is sometimes taken into the condensed flocks during the condensation and/or separation process of the photo-catalyst particle. In such the case, since the suspended solid is accumulated in the oxidization processing reservoir 1, therefore, it is preferable to provide a means or an apparatus for removing the suspended solid from the raw water in advance. For example, in a case where the raw water containing such the suspended solid flows into the oxidization processing reservoir 1, the inorganic coagulant is consumed or wasted by the condensation with the suspended solid flowing therein, therefore it is preferable to further provide an apparatus to add the inorganic coagulant depending upon the concentration of the suspended solid, in the oxidization processing reservoir 1 or the fast speed stirring reservoir 5.

Figure 2:
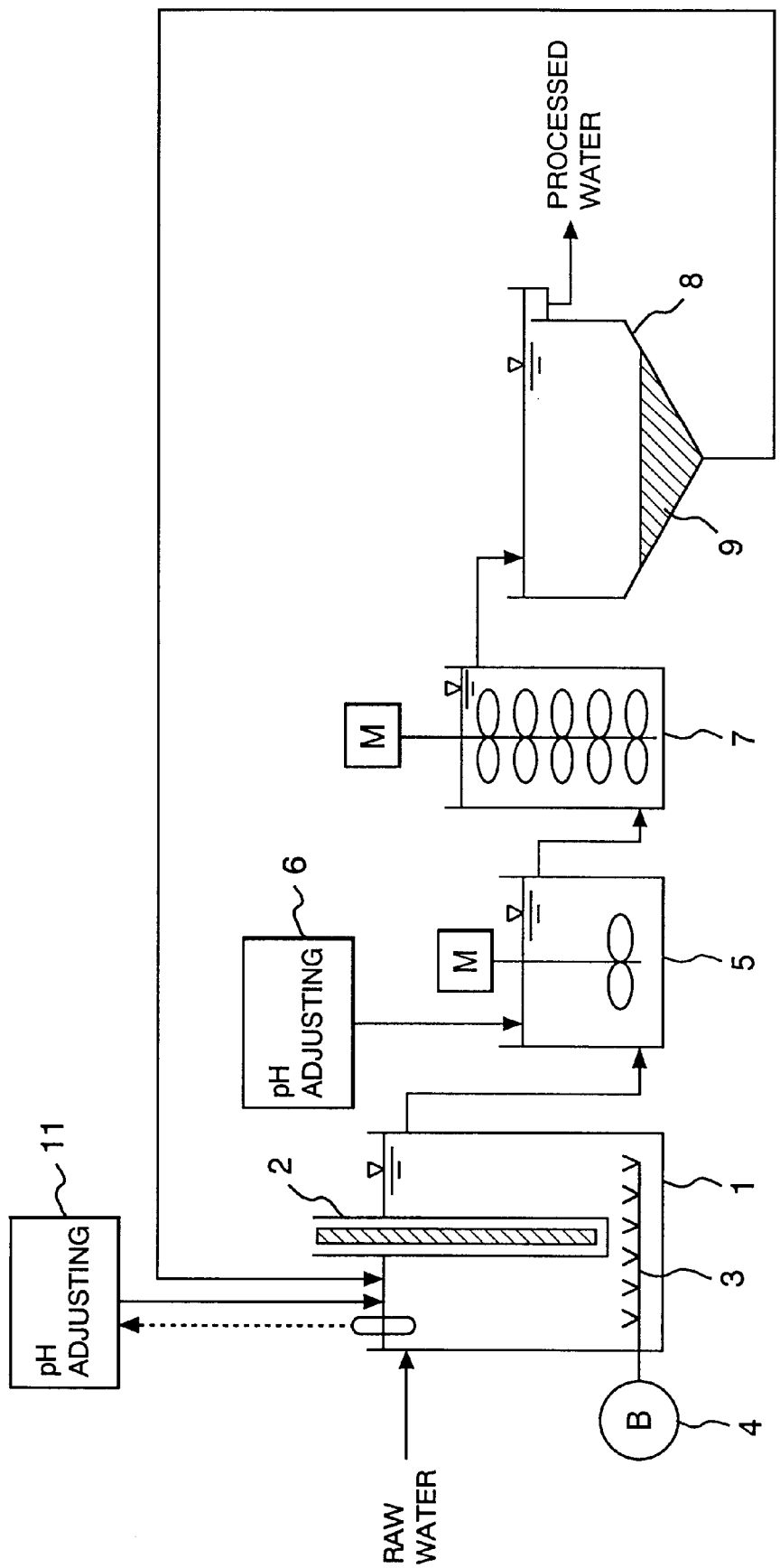
FIG. 2 is a block diagram of showing a variation of water purification apparatus shown in FIG. 1.

FIG. 2 shows a variation of the continuous water purification apparatus of the above embodiment according to the present invention. In this variation shown in FIG. 2, the same reference numerals indicate the same or similar elements as shown in FIG. 1, thereby omitting the duplicated explanation thereof.

As is apparent from this FIG. 2, with this variation, it is so constructed that the sludge containing the photo-catalyst particle and the inorganic coagulant, which is separated by the sedimentation thereof in the sedimentation separating reservoir 8, is turned back to the oxidization processing reservoir 1 directly, without passing through the sludge dissolving reservoir 10, and that the pH adjuster 11 puts the acid or alkaline materiel into the raw water in the oxidization processing reservoir 1. Also, with such the construction, as is indicated by a broken line in the figure, the pH detector 100 may be provided in the above oxidization processing reservoir 1, thereby controlling the addition amount of the acidic or alkaline materiel to be put into from the pH adjuster 11 on the basis of the detected pH value from this detector. Further, with the variation of such the construction, the functions or operations of dispersing the photo-catalyst particle and of regenerating the inorganic coagulant are same or similar to that shown in FIG. 1.

By the way, with the construction of such the variation, it is possible to control the pH value of the raw water in the oxidization processing reservoir 1 at optimal, therefore is suitable, in particular for processing of the raw water containing carbonic acid salt much therein. Namely, though the oxidizing power due to formed hydroxyl radical gives effect on the oxidization function very much in the photo-catalytic reaction, however, it is sometimes occurs that the reaction upon the material(s) or matter(s) to be processed with the oxidization is prevented, since bicarbonate ion and/or carbonate ion reacts with the hydroxyl radical, quickly or swiftly in the raw water containing the carbonic acid salt much therein. In this manner, if the carbonic acid salt is contained much in the raw water, it is preferable to control the pH value of the raw water in the oxidization processing reservoir 1 at the optimal value, as described in the present variation. In particular, it is possible to perform the oxidization process with high efficiency by putting the acidic material from the above pH adjuster 11 into the raw water to turn it into acidity, thereby bringing bout oxidization due to the photo-catalyst under the condition where the carbonic acid salt is reluctant to be dissolved.

Figure 3:
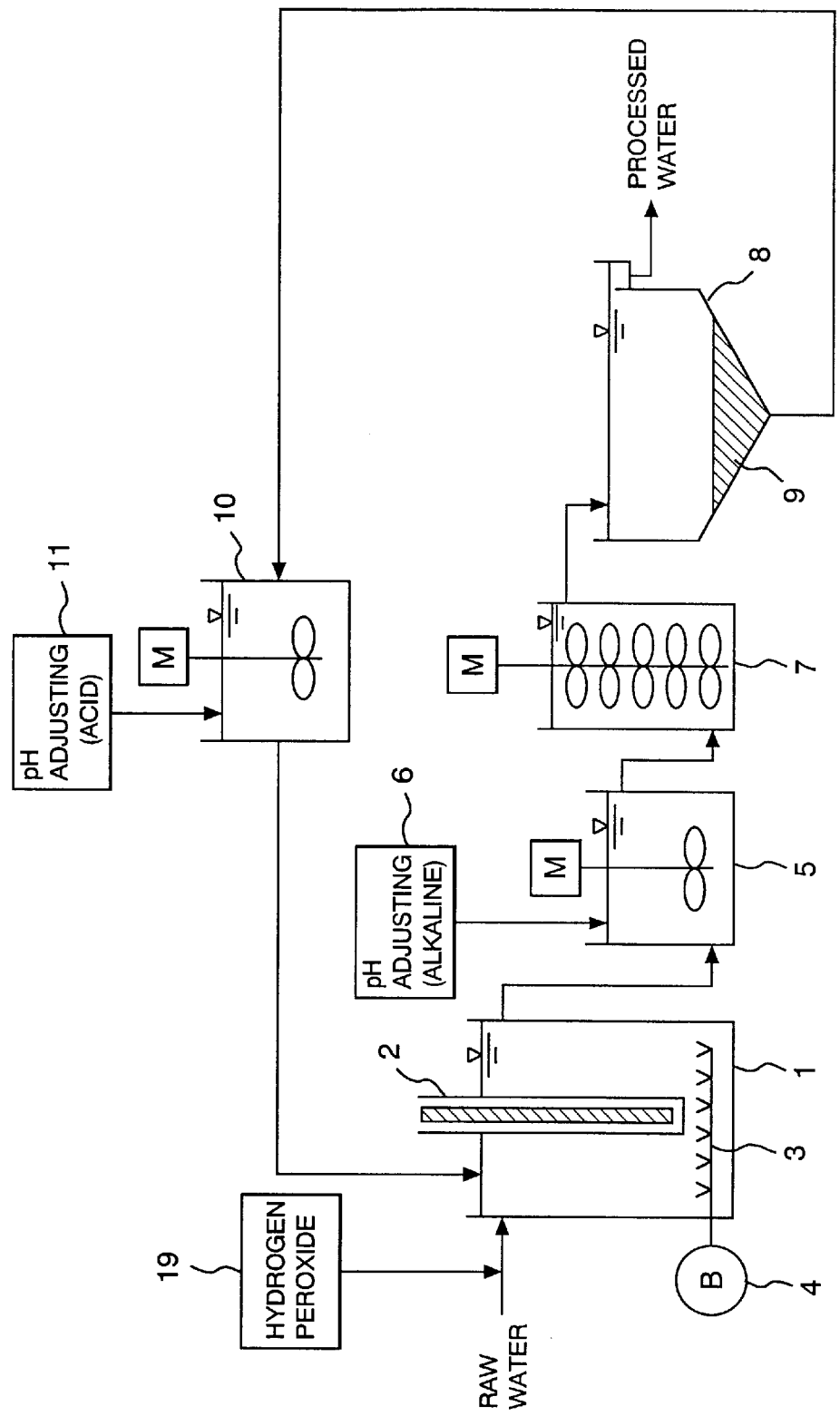
FIG. 3 is also a block diagram of showing another variation of water purification apparatus shown in FIG. 1.

Furthermore, in the attached FIG. 3, there is shown another variation of the continuous water purification apparatus according to the embodiment shown in FIG. 1. However, also in the another variation shown in FIG. 3, the same reference numerals as in FIG. 1 indicate the same or similar element thereof, and the duplicated explanation will be omitted therefrom.

As is apparent from this FIG. 3, although the water purification apparatus according to the another variation is almost same or similar to that of shown in FIG. 1 in the basic construction thereof, however, as is apparent from the figure, there is further provided an injection means 19 of hydrogen peroxide, for continuously adding hydrogen peroxide as the oxidant into the raw water introduced into the above oxidization processing reservoir 1. However, with the purification apparatus of this another variation, it is preferable to use an inorganic coagulant of iron or ferrous group including iron ion as the inorganic coagulant together with the photo-catalyst powder or particle as the purification processing agent. This is because of occurrence of a so-called "Fenton oxidization reaction" due to the fact of coexistence of both the hydrogen peroxide and the iron ion in the raw water, i.e., a phenomenon in which OH-radical showing strong oxidizing power is generated from the hydrogen peroxide with the catalyst of the iron ion when they are coexisting. And, according to the water purification apparatus according to the present another variation, by the synergetic effect between this Fenton oxidization reaction and the oxidization due to the photo-catalyst, it is possible to realize the oxidization process with high efficiency.

However, with this Fenton oxidization reaction, it is already known that strong oxidization power can be obtained under the acid circumference or environment (for example, from 2 to 4 in the pH value). Then, with this another variation, the pH adjuster 11 mentioned above is so constructed that, it puts the acidic material into the sludge dissolving reservoir 10, while the pH adjuster 6 putting the alkaline material into the fast speed stirring reservoir 5. With such the construction, the slurry transferred from the above sludge dissolving reservoir 10 to the oxidization processing reservoir 1 is adjusted or regulated to the acidity so as to dissolving the separated sludge 9 therein. Then, by adding this into the oxidization processing reservoir 1, it is possible to turn the raw water therein into the acidity with ease, therefore being convenient or preferable.

Further, in the Fenton oxidization reaction, the iron ion of divalent is oxidized to be the trivalent iron ion since it reacts as the catalyst. However, the ultraviolet ray lights from the light source 2 within the oxidization processing reservoir 1 is irradiated upon this trivalent iron ion, thereby turning it into the divalent ion of iron again. Therefore, since the iron ion as the catalyst is reused repeatedly within the oxidization processing reservoir 1, there is no need to add it into continuously. As is mentioned in the above, with the water purification apparatus according to this another variation, by adding the hydrogen peroxide into the raw water, and further by applying the coagulant of the iron or ferrous group as the inorganic coagulant, the oxidization process with high efficiency can be obtained by the synergetic effect of the photo-catalytic reaction and also the Fenton oxidization reaction as well, not only being restricted to the embodiment and the variation shown in FIGS. 1 and 2 in the above, but also being applicable to the embodiment(s) which will be give below.

Figure 4:
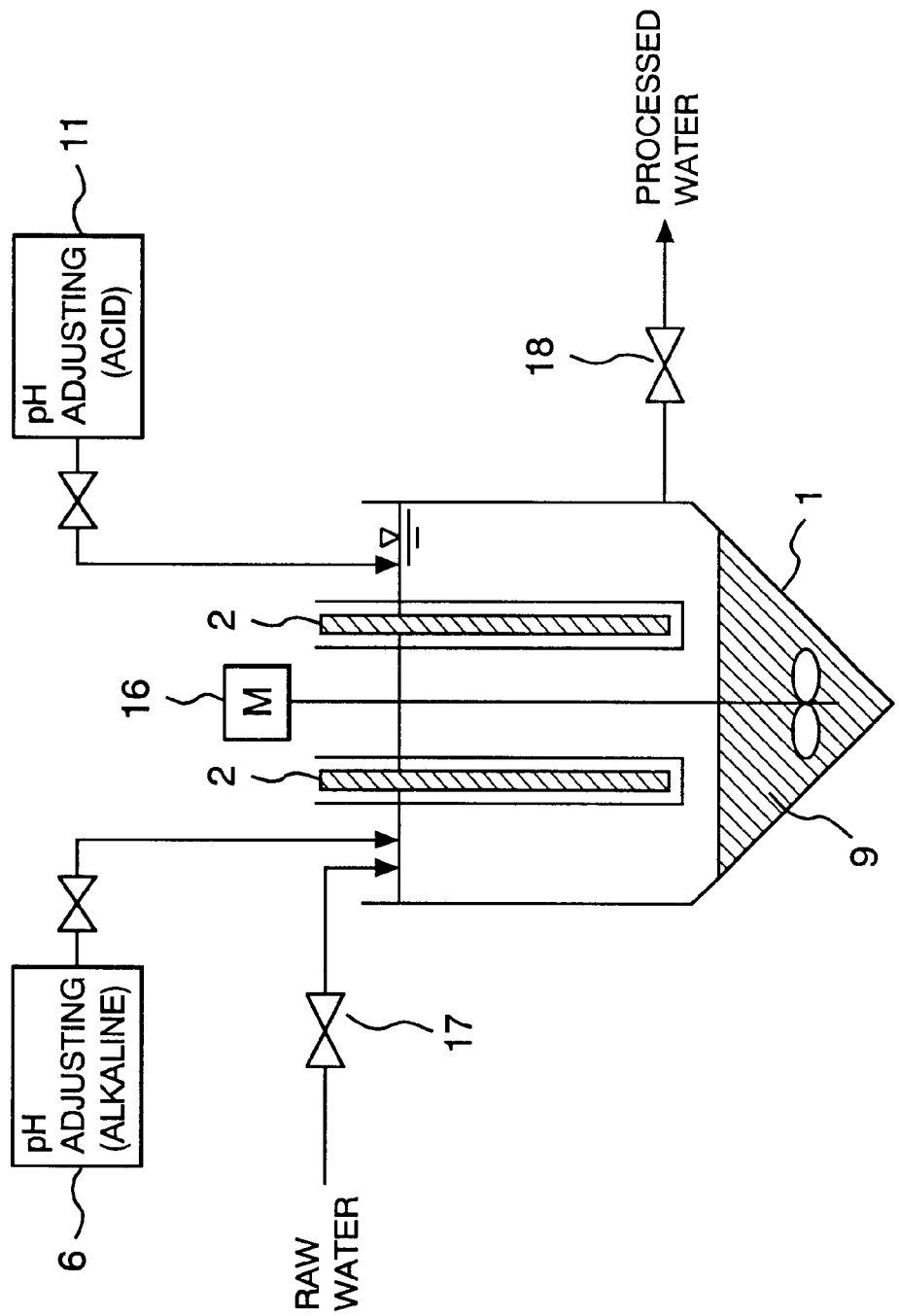
FIG. 4 is a block diagram of showing the construction of a water purification apparatus of a batch type according to another embodiment of the present invention.

Next, attached FIG. 4 shows the water purification apparatus according to an another embodiment of the present invention. The purification apparatus according to the another embodiment, differing from that of continuous processing type, is the water purification apparatus of a batch type or method. However, the same reference numerals in this another embodiment also indicate the same or similar elements as shown in FIG. 1 in the above.

In the figure, within the oxidization processing reservoir 1 providing the ultraviolet ray light source 2 therein is also cast or put into the above-mentioned photo-catalyst powder and the inorganic coagulant in advance. First of all, an inflow valve 17 for raw water is opened to introduce the raw water into the oxidization processing reservoir 1 up to a predetermined water level. In this instance, a raw water discharge valve 18 for the oxidization processing reservoir 1, of course, is closed. In this another embodiment, a series of the processes mentioned in the above (i.e., the oxidization process due to the photo-catalyst powder or particle, the condensation of the photo-catalyst particle dispersed into the raw water due to the inorganic coagulant, etc.) are performed within the oxidization processing reservoir 1, therefore, a stirrer 16 is provided with the ultraviolet ray light source 2 (but, two sources in the figure) within the body of the oxidization processing reservoir 1, and the bottom portion of the reservoir 1 is formed in a conical shape.

Following to the above, when the raw water reaches up to the predetermined water level, the raw water inflow valve 17 is closed so as to execute the purification processes of the raw water in the oxidization processing reservoir 1 (i.e., the water to be processed). In that instance, it is preferable to stir the raw water appropriately by driving the stirrer 16 provided within the oxidization processing reservoir 1, so as to disperse the photo-catalyst powder with uniformity therein. After that, the oxidization process due to the photo-catalyst particle is treated for a predetermined time. Namely, after the ultraviolet ray light sources 2 are lighten to irradiate the photo-catalyst particle with the light so as to cause the photo-catalytic reaction therewith, then an operation or process is initiated for separating the photo-catalyst particle dispersed from the raw water which has been purified (processed water).

In the separation process of the photo-catalyst particle, first, the alkaline material is put into the raw water (the processed water) containing the inorganic coagulant therein by means of the pH adjuster 6, thereby adjusting or regulating the pH value thereof to a value being optimal for the condensation function with the inorganic coagulant. Then, the particle of the photo-catalyst and the inorganic coagulant are condensed together to be flocculated, at this moment, it is preferable to perform the stirring operation with a stirring strength and a time which are appropriate or suitable for the growth of the flocks, for instance by adjusting or regulating the rotating speed of the stirrer 16. For example, for the growth of the flocks, it is preferable that the rotational speed of this stirrer 16 is set at a high speed in the beginning and then is adjusted down to a low speed gradually or in stepwise. Further, as mentioned in the above, the pH detector for measuring the pH value may be provided in the oxidization processing reservoir 1.

Following to the above, when the stir by rotation of the stirrer 16 is stopped, the particles of the photo-catalyst particle and the inorganic coagulant which is flocculated by condensing together in the raw water settles down easily onto the bottom of the oxidization processing reservoir 1. Then, after leaving the raw water in stable within the oxidization processing reservoir 1 for a time necessary for the sedimentation of the flocks, the processed water can be separated from the flocculated photocatalyst particle and the inorganic coagulant, with ease, by releasing the discharge valve 18 for the processed water.

Thereafter, the separated and accumulated sludge 9 including the flocks formed with condensation of the photo-catalyst particle and the inorganic coagulant is turned to be acidic by means of the acidic material put into from the pH adjuster 11. Thereby, the inorganic coagulant accumulated onto the bottom of the oxidization processing reservoir 1 is dissolved again, and the photo-catalyst particle is released from the condensation function of the inorganic coagulant. Namely, by introducing the raw water into the oxidization processing reservoir 1 under that condition, the photo-catalyst particle is dispersed into it again. However, in this instance, also it is preferable to rotationally drive the above stirrer 16 with appropriate, for dissolving the separated sludge 9 completely.

Following to the above, closing the discharge valve 18 for the processed water while releasing the inflow valve 17, again, the raw water to be processed is introduced into the oxidization processing reservoir 1. By repeating the operations or processes mentioned in the above, the photo-catalyst particle and the inorganic coagulant are separated to be reused, thereby being enabled to be used repetitively or repeatedly. Namely, the water purification apparatus according to the present another embodiment, with the purification of the batch process (i.e., the raw water is processed by filling up the oxidization processing reservoir 1 with the predetermined volume of water once), it is possible to realize the series of processes with only the oxidization processing reservoir 1, and to making the apparatus compact in the size or scale thereof.

With the water purification apparatus and the water purification method being practiced thereby, the pH value of the fluid to be processed, i.e., the raw water containing the photo-catalyst particle and the inorganic coagulant, is controlled, in other words, the pH value in the oxidization processing reservoir 1 is adjusted or regulated into the acidity side when dispersing the photo-catalyst particle, thereby accelerating the oxidization process due to the photo-catalytic reaction with high efficiency, on the other hand, the pH value is adjusted or regulated to be neutralized when separating the photo-catalyst particle from the processed water, thereby flocculating it with condensation. Further, the separated sludge, i.e., the flock including the photo-catalyst particle and the inorganic coagulant is dissolved again by adjusting or regulating the pH value thereof within the dissolving reservoir, so as to be put into the water to be processed in the oxidization processing reservoir, thereby enabling eternal or endless reuse of them.

Namely, with the water purification apparatus with use the photo-catalytic reaction, in which the photo-catalyst particle can be used under the condition of fine or minute particle showing good reaction efficiency, and in which the photo-catalyst particle is separated from the processed water easily and is further able to be reused after separation, it is possible to accomplish or provide the water purification apparatus with applying the photo-catalyst thereto, being able to be practiced with actual product level.

Figure 5:
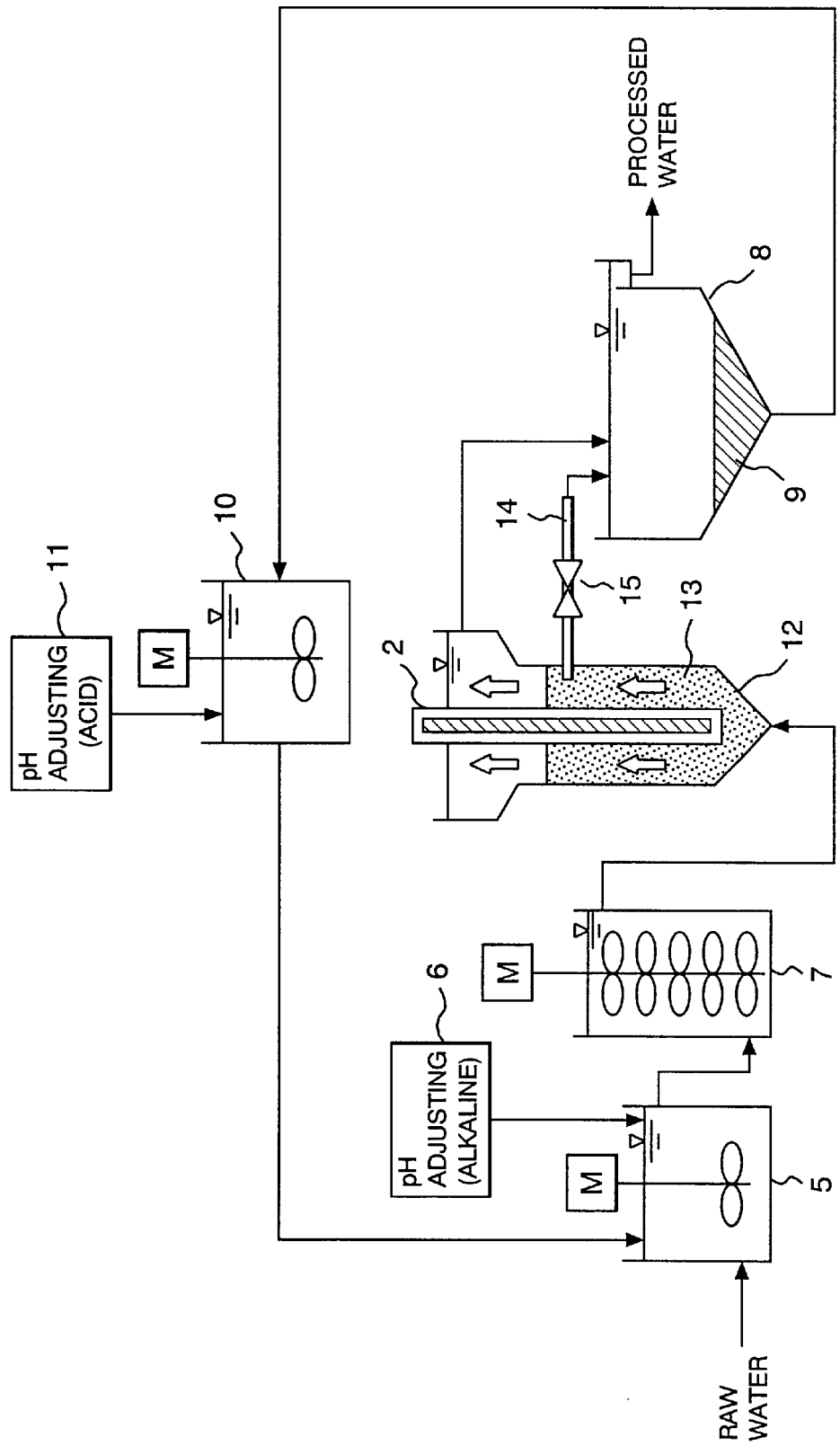
FIG. 5 is a block diagram of showing the construction of a water purification apparatus according to an other embodiment of the present invention.

Next, attached FIG. 5 shows the water purification apparatus according to an other embodiment of the present invention. However, in the present other embodiment, as is apparent from the figure, a so-called fluidized bed type reservoir 12 is used or applied to as the oxidization processing reservoir 1. This fluidized bed type oxidization processing reservoir 12 also achieves the water purification through the oxidization of the photo-catalyst, by letting the raw water being contact with the flocculated photo-catalyst particle, at the same time forming the flock by condensing the photo-catalyst particle with the inorganic coagulant within the reservoir.

In the water purification apparatus according to the other embodiment, first of all, the raw water to be processed or purified is introduced into the fluidized bed type oxidization processing reservoir 12 from the bottom thereof into an upper direction through the fast speed stirring reservoir 5 and the slow speed stirring reservoir 7. This introduced raw water passes through among condensed particles of the photo-catalyst (i.e., the particles are flocculated) settled down on the bottom of the fluidized bed type oxidization processing reservoir 12 so as to reach to the upper portion of the reservoir, and is introduced from the outlet thereof into the sedimentation separation reservoir 8. In the instance, the reaction of oxidization is caused by irradiating the light upon the photo-catalyst particles from the ultraviolet ray light source 2 provided in the oxidization processing reservoir 12, thereby purifying or oxidizing the organic composition(s) contained in the raw water. And, the raw water purified is discharged from the sedimentation separation reservoir 8 mentioned above to be the processed water.

However, in the purification apparatus mentioned above, the raw water introduced upwardly from the bottom is adjusted or regulated in the flow velocity such that the photo-catalyst particles flocculated and settled down on the bottom of the oxidization processing reservoir 12 will not flow out together with the raw water. Here, as mentioned in the above, the photo-catalyst particles flocculated come to be large in the diameter, thereby showing a good settle-down property, further on the other hand reducing the reaction efficiency, since the specific surface area thereof is reduced down. Then, according to the further other embodiment, by controlling the pH value in the oxidization processing reservoir 12 and also the addition amount of the inorganic coagulant, the particle diameter of the flocculated photo-catalyst particles is kept to be equal or less than 0.1 mm, in particular, more preferably to be in a range from 0.1 $\mu$m up to 0.1 mm, thereby obtaining sufficient reaction efficiency from an actual practical view point. Further, as was mentioned in the above, the pH detector may be provided in the oxidization processing reservoir 12, thereby controlling the pH value and/or the putting amount of the inorganic coagulant and so on, with use of the pH value detected in the reservoir.

Namely, according to the above construction, with the water current of the raw water flowing upwardly within the oxidization processing reservoir 12, the flocculated photo-catalyst particles showing the settle-down property forms layers of the photocatalyst particles with floating on it, and the ultraviolet ray light is irradiated from the light source 2 on the layers of the photo-catalyst particles, thereby causing the photo-catalytic reaction thereon. And, basically, the photo-catalyst particles in the form of flocks formed due to the condensation function of the inorganic coagulant remain within the fluidized bed type oxidization processing reservoir 12. However, sometimes a part of the photo-catalyst particles of the flock has a small diameter so that it flows out together with flow of the raw water. Then, according to the other embodiment, the processed water discharged from the upper part of the fluidized bed type oxidization processing reservoir 12 is led into the sedimentation separation reservoir 8 once, and here is separated from the photo-catalyst particles flowing out by the sedimentation thereof, so as to be discharged at the top clear portion of it to be the processed water.

Further, the separated sludge 9 settling down on the bottom of the sedimentation separation reservoir 8 is led into the sludge dissolving reservoir 10, in the similar manner as in the above FIG. 1, and is reproduced as the photo-catalyst particles by dissolving the inorganic coagulant condensing therewith under the acidic circumference with putting the above acidic material from the pH adjuster 11 into it. And, the dissolved photo-catalyst particles and the inorganic coagulant are returned back into the fast speed stirring reservoir 5, in which they are put into the raw water for enabling the reuse thereof. Namely, the raw water being adjusted or regulated at a predetermined pH value (i.e., being neutralized) by putting the alkaline material from the pH adjuster 6 forms the flock of the good settle-down property, with glowing the flock of the photo-catalyst particles due to the condensation function of the inorganic coagulant in the slow speed stirring reservoir. Then, the flocks formed is returned back into the above-mentioned fluidized bed type oxidization processing reservoir 12 again to be stayed therein.

However, in the water purification apparatus according to the other embodiment mentioned above, with the provision of the above pH adjuster 6 in the fluidized bed type oxidization processing reservoir 12, it is also possible to eliminate the fast speed stirring reservoir 5 and/or the slow speed stirring reservoir 7. In this case, the photo-catalyst particles and the inorganic coagulant returned form the flocks upon collision of the particles thereof in the water current rising upward, within the oxidization processing reservoir 12.

Also, as mentioned previously, in the oxidization process of the organic matter(s) contained in the water with use of the photo-catalytic reaction, the metallic ion in the raw water sometimes adheres on the as the photo-catalyst particles as the scale covering the surface thereof, thereby preventing the photo-catalyst particles from the reaction of oxidization thereof. Therefore, in the water purification apparatus according to the further other embodiment, a draw-out conduit 14 with a valve 15 is provided in a part of the above fluidized bed type oxidization processing reservoir 12 (i.e., a portion where the flocculated photo-catalyst particles pile up, in the present embodiment). And, by operating the valve 15 open and close, a portion or all of the photo-catalyst particles piled up in the fluidized bed type oxidization processing reservoir 12 is introduced into the sedimentation separation reservoir 8 so as to settle down, continuously or intermittently. The particles settled down is transferred as the separated sludge to the sludge dissolving reservoir 10 to dissolve the scale under the acidic circumference therein, thereby reproducing it by removing the scale from the surface of the particle of the photo-catalyst.

Further, in the water purification apparatus according to the other embodiment, the photo-catalyst particles and the inorganic coagulant flowing out from the fluidized bed type oxidization processing reservoir 12 must not be separated, reproduced (i.e., dissolving of the coagulant), nor returned continuously, if controlling them to very small amount comparing to the total amount thereof, i.e., it is also possible to operate without the provisions of the above sedimentation separation reservoir 8 and the sludge dissolving reservoir 10. However, in that case, it is preferable to provide an adding apparatus of the photo-catalyst powder and/or the inorganic coagulant, for example in the fast speed stirring reservoir 5.

However, in the water purification apparatus according to the other embodiment, basically, the photo-catalyst particles of the flocks, being formed by the condensation function of the inorganic coagulant, stay within the fluidized bed type oxidization processing reservoir 12. From this, the amount or volume of the sludge of the photo-catalyst particles and the inorganic coagulant to be transferred into the above sludge dissolving reservoir 10 to be dissolved is small, therefore the acidic or alkaline material to be used during the purification process is also small in the amount, thereby enabling an economic operation of the apparatus. Further, from principle of the operation in the apparatus, the processed water discharged from the above fluidized bed type oxidization processing reservoir 12 shows almost neutralization, therefore providing an advantage, in particular, in that there is no need to further neutralize the water in the water purification process thereafter.

In the water purification apparatuses and the water purification methods mentioned in the above, according to the embodiments and the variations of the present invention, the powdered titian oxide is put into the raw water to be processed as the catalyst for oxidizing the organic matter(s) contained therein, and is activated by irradiation of the ultraviolet rays for oxidation process. According to the present invention, it should not be limited only to it, however, the followings are also applicable as the above catalyst for oxidizing the organic matter(s), i.e., metal oxide semiconductor particles, such as manganese oxide, tungsten oxide, iron oxide, etc., including the titanium oxide, metal sulfide semiconductor particles, such as zinc sulfide, cadmium sulfide, tungsten sulfide, and further metals, such as platinum, palladium, rhodium, iridium, copper, gold, tungsten, etc., as well as indissoluble and/or hardly dissoluble chemical compound thereof.

Also, for the purpose of accelerating the function of oxidizing the organic matter(s) by activating the catalysts listed in the above, activation of the catalyst by irradiating of the ultraviolet rays is applicable, in particular for the titanium oxide, as was mentioned in the above. However, the present invention should not be limited to it, however it is also possible to activate the catalyst, for example, by injecting (or adding) ozone into the oxidization processing reservoir, in place of the irradiation of ultraviolet rays mentioned above.

Figure 6:
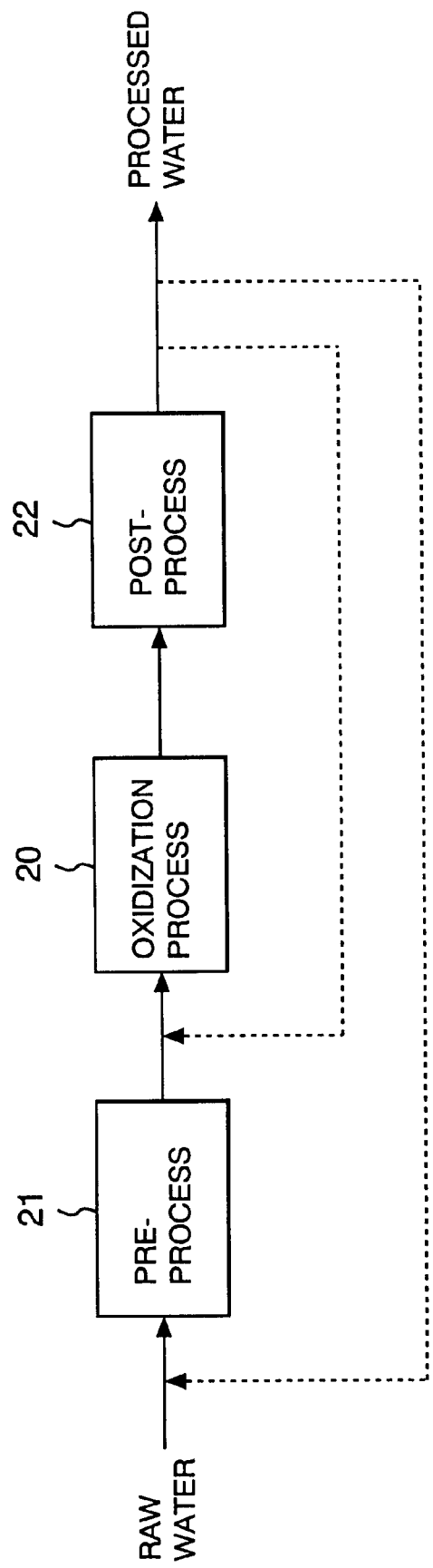
FIG. 6 is a block diagram of showing the construction of a water purification system in which the water purification apparatus according to the present invention is applied.
Figure 7:
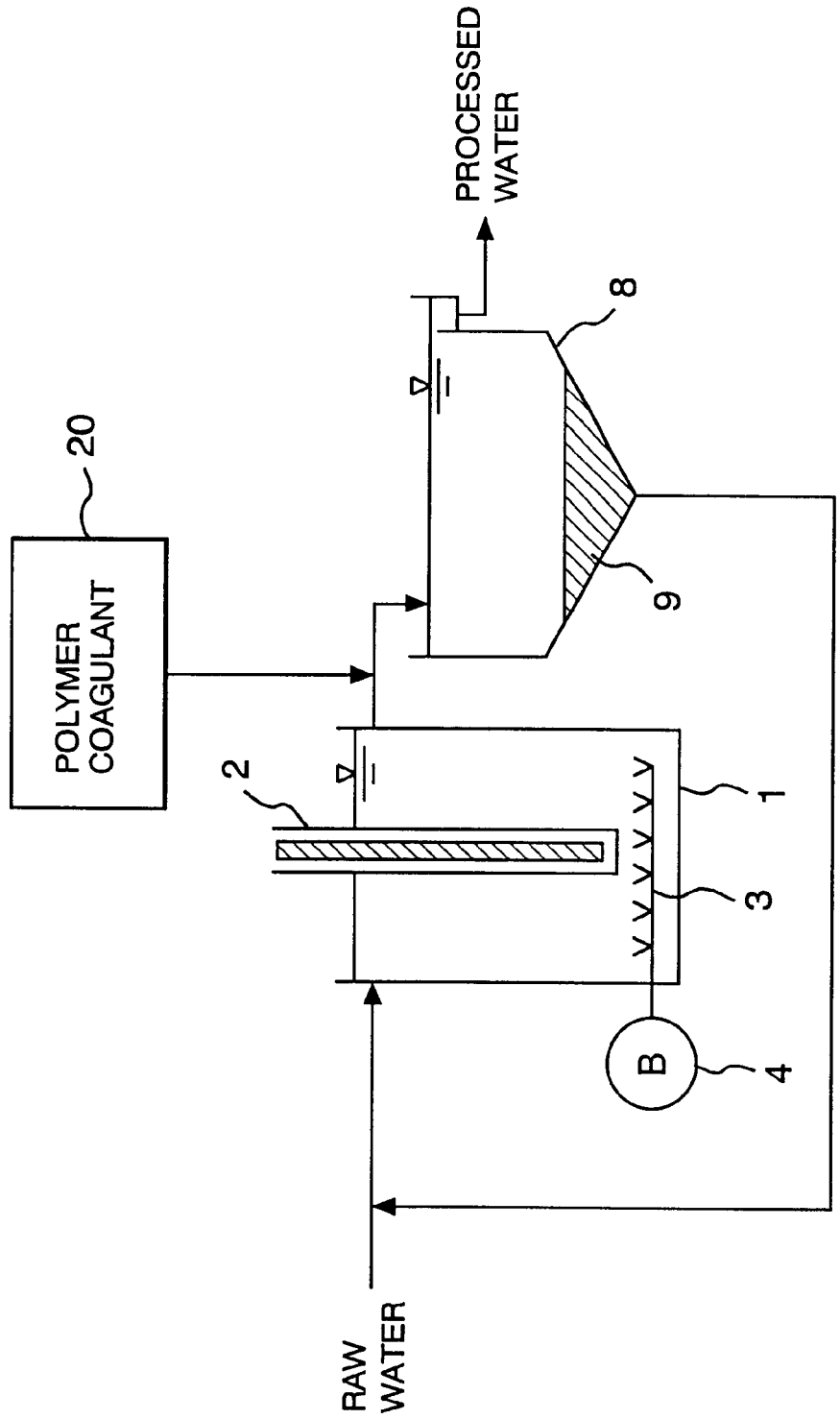
FIG. 7 is a block diagram of showing an example of the construction of the water purification apparatus according to the conventional art.

Further, FIG. 6 shows a water purification system in which is installed the above water purification apparatus according to the present invention. As an oxidization processing apparatus 20 in the present water purification system, the water purification apparatuses which are shown in above FIGS. 1 to 5 can be applied to, in which the oxidization function of the photo-catalyst is utilized according to the present invention. Further, in this water purification system, a pre-processing apparatus 21 is provided in an upper stream of the above oxidization process apparatus 20, while a post-processing apparatus 22 is provided in a down stream thereof. With such the construction of the system, a water to be processed (i.e., the raw water), after being processed with the pre-processing apparatus 21 firstly, is processed by oxidation thereof with the above oxidization processing apparatus 20, then is further processed with the post-processing apparatus 22 to be discharged as the processed water.

Here, the pre-processing apparatus 21 is one for mainly removing the muddy or suspended material(s) contained in the raw water, into which is applied a water processing method, such as condensation deposition, condensation sand filtering, membrane filtering, etc. As mentioned in the above, since the oxidization process apparatus 20 according to the present invention performs the process of oxidization by collecting and reusing the fine or minute photo-catalyst, it is not preferable that such the muddy or suspended material(s) flows into the oxidization process apparatus 20 other than the photo-catalyst. Therefore, with addition of the pre-processing apparatus 21 for removing the muddy or suspended material(s) contained in the raw water in advance in the upper stream of the oxidization process apparatus 20, it is possible that the better purification process is performed in the oxidization process apparatus 20.

Furthermore, the post-processing apparatus 22 is one for removing the organic material (s) which is remained in the processed water flowing out from the oxidization processing apparatus 20, into which is applied a water processing method, such as absorption processing with use of activated carbon (activated carbon absorption process), biological process by oxidization with use of microorganisms, or biological active carbon process with use of the active carbon as carrier for the microorganisms, etc. As is mentioned previously, the oxidization processing apparatus 20 performs the process of oxidization for the purpose of removing the organic matter(s) in the processed water with use of the photo-catalyst, however it is sometimes difficult to decompose it/them into elements of only water and carbon dioxide completely, or it takes a long time to decompose it/them completely, depending upon the kinds or sorts of organic matter(s). Then, with addition of the post-processing apparatus 22 in the down stream of the oxidization processing apparatus 20, it is possible to remove the organic matter(s) which cannot be removed completely but remained even by the decomposing thereof in the oxidization processing apparatus 20, thereby achieving a purification process of more highly leveled.

In particular, in a case where the activated carbon absorption process is applied into the post-processing apparatus 22, even if the organic matter(s) in the water to be processed cannot be decomposed completely in the oxidization processing apparatus 20, however it is convenient for the activated carbon absorption process which is good at removing low molecular organic matter(s) in water, since the organic matter(s) is decomposed halfway into such the low molecular by the effect of the photo-catalyst.

Also, in particular, in a case where the biological process is applied into the post-processing apparatus 22, even if the organic matter(s) in the water to be processed cannot be decomposed completely in the oxidization process apparatus 20, however it is decomposed by the photo-catalyst halfway therein. The photo-catalyst, also in this case, shows an effect that it decomposes the organic matter(s) which can be hardly decomposed by the biological processing into those that can be easily decomposed by it, therefore being convenient for the biological processing being superior in removing the organic matter(s) which can be decomposes easily by the microorganisms.

Furthermore, in a case where a biological activated carbon process is adopted, in which the activated carbon absorption process and the biological process mentioned above are combined, a synergistic effect can be expected upon both of them of the above-mentioned. However, either one of the pre-processing apparatus 21 or the post-processing apparatus 22 can be omitted depending upon the quality or nature of the raw water.

Moreover, in the present embodiment, as is shown by arrows of broken lines in FIG. 6, it is also possible to return a portion of the processed water back to an inlet of the oxidization processing apparatus 20 via a return conduit 23 of the processed water, or back to an inlet of the pre-processing apparatus 21 via a return conduit 24 of the processed water, thereby achieving a circulating process thereof. In particular, when the biological process is applied to or performed in the post-process apparatus 22 with using the oxidation process by the microorganisms, there is remained the organic matter(s) being hardly decomposed biologically as the result of this biological decomposition in the post-process apparatus 22. Then, by returning the portion of the processed water back into the above oxidization process apparatus 20, it is possible to decompose it/them or to change into organic matters which can be easily decomposed in the biological process. Namely, by repeating the oxidation process in the above oxidation processing apparatus 20 and the biological process in the post-process apparatus 22 alternatively, including the process in the pre-process apparatus 21, it is possible to obtain the water being highly purified much more.

As is fully described in the above, according to the present invention, there can be provided the water purification apparatus and the method thereof, with which the purification process of water can be achieved with maintaining the oxidizing reaction due to the photo-catalyst at a high efficiency, without using such the expensive polymer coagulant.

What is claimed is:

1. A water purification apparatus for purifying water containing an organic matter, comprising:

an oxidation processing reservoir for holding water comprising an inorganic coagulant and catalyst particles and for flocculating said catalyst particles;

means for activating said catalyst particles inside said oxidation processing reservoir, wherein said catalyst particles comprise a photocatalyst and said catalyst activating means comprises means for emitting light;

a separation reservoir for separating the flocculated catalyst particles from the waters means for controlling the pH within said separation reservoir; and means for maintaining the diameter of the flocculated catalyst particles in the water in said oxidation processing reservoir to be equal to or less than 0.1 mm, wherein said particle diameter maintaining means comprises means for controlling the pH in the water in said oxidation processing reservoir.

2. A water purification apparatus as defined in claim 1, wherein said particle diameter maintaining means further comprises means for detecting the pH in the water in said oxidation processing reservoir.

3. A water purification apparatus as defined in claim 1, wherein said oxidation processing reservoir and said separation reservoir are formed as an unit.

4. A water purification apparatus as defined in claim 1, wherein said oxidation processing reservoir comprises means for aerating the water therein.

5. A water purification apparatus as defined in claim 1, wherein said oxidation processing reservoir further comprises means for injecting ozone into the water therein.

6. A water purification apparatus as defined in claim 1, further comprising means for adding a material which induces a Fenton oxidation reaction in the water within said oxidation processing reservoir.

7. A water purification apparatus as defined in claim 1, further comprising a stirrer between said oxidation processing reservoir and said separation reservoir.

8. A water purification apparatus as defined in claim 1, further comprising means for returning sludge containing said catalyst particles from said separation reservoir to said oxidation processing reservoir.

9. A water purification apparatus as defined in claim 8, wherein said sludge returning means further comprises means for dissolving the sludge.

10. A water purification apparatus as defined in claim 1, wherein the inorganic coagulant is an aluminum salt or an iron salt.

11. A water purification apparatus as defined in claim 10, wherein the inorganic coagulant is selected from the group consisting of aluminum sulfate, aluminum chloride, ferrous sulfate, ferric sulfate, and ferric chloride.

12. A water purification apparatus for purifying water containing an organic matter, comprising:

an oxidation processing reservoir for holding water comprising an inorganic coagulant and catalyst particles and for flocculating said catalyst particles, wherein said catalyst particles comprise a photocatalyst;

a light source that activates said catalyst particles inside said oxidation processing reservoir;

a separation reservoir for separating the flocculated catalyst particles from the water;

a first controller that controls the pH within said separation reservoir; and a second controller that maintains the diameter of the flocculated catalyst particles in the water in said oxidation processing reservoir to be equal to or less than 0.1 mm, wherein said second controller controls the pH in the water in said oxidation processing reservoir.

13. A water purification apparatus as defined in claim 12, wherein said said second controller controls the pH in the water in said oxidation processing reservoir to a pH of between 2 to 4 or between 9 to 12.

* * * * *